Patented Dec. 14, 1926.

1,611,072

UNITED STATES PATENT OFFICE.

ERICH REINAU, OF BERLIN-STEGLITZ, GERMANY.

METHOD OF PROMOTING THE GROWTH OF PLANTS WITH CARBON DIOXIDE.

No Drawing. Application filed February 6, 1923, Serial No. 617,388, and in Germany June 21, 1921.

This invention relates to a method and means for supplying carbon dioxide to plants for promoting the growth of the plants.

Fertilizing by means of carbon dioxide has hitherto been executed either with the aid of stationary plants or with the aid of transportable devices. The stationary plants which serve to conduct purified waste gases from industrial plants through pipe systems upon the land where the gases are liberated are adapted only for very large gardeners' establishments and they are, of course, not transportable. For fertilizing on the spot steel bottles are mainly used which contain the carbon dioxide in liquid state. This method is very expensive and it presents further the inconvenience that it is difficult to distribute the liquid carbon dioxide in small measured quantities.

According to the invention measured quantities of carbon dioxide are prepared in a handy form so that they can be used at any time and place or under any conditions, on the open field or in green houses.

With this object in view determined quantities of carbon are used which, when being burnt on the spot produce the quantity of carbon dioxide required for promoting the growth of special plants.

The carbon is supplied either in powder shape or in solid state as cartridges, briquettes, rods or the like in various concentration so that, according to the degree of concentration, a predetermined portion of the carbon produces a predetermined quantity of carbon dioxide. It is essential that predetermined quantities of carbon dioxide, which can be easily calculated, are produced by burning a predetermined quantity of carbon.

The method consists in burning on the spot, in the green house or on the open field, according to gassing tabula, in which the atmospheric temperature, exposure to the solar rays, kind of plants and so on are taken into consideration, and on which the actually required quantity of carbon to be combusted can be read, so many carbon, for instance in the shape of briquettes, that the desired quantity of carbon dioxide and the desired concentration of the same is produced for the fertilizing of the plants.

The burning of the carbon designed to produce the carbon dioxide for fertilizing is preferably carried out in a stove of convenient construction.

The stoves which are adapted for this purpose, must have a strong internal draught at the one side and may consist for instance of a vertical hollow cylinder having a grate at the lower end and a nozzle shaped gas outlet at the upper end which is arranged so that the gas mixture which contains the carbon dioxide flowing out of said nozzle sucks on cold outer air, in which case no hot gases will come in contact with the plants. It is further essential that the body of the stove be enveloped by a material, for instance fire brick or diatomit-stone which are refractory and bad conductors of heat so that a lateral radiation of heat on the green house beds is avoided.

In carrying out the fertilizing it is necessary on the one hand that an easily combustible carbon be used and that, on the other hand the gases of combustion be free from any substances which might have an injurious effect on the plants. Charcoal and crude-coke for instance fulfill these conditions.

Other fuels might however be prepared so that they are adapted for the purposes of the production of pure carbon dioxide in the stove, if they are submitted to a heating or coking process in the presence of substances which bind the impurities. The purity of the carbon dioxide generated by the combustion may further be ensured by admixing the powdered combustible material, for instance coke, at the briquetting with substances which bind the noxious gases produced, for instance the sulphur dioxide. Lime or baryte would be for instance such an addition.

I claim:—

Method of producing carbon dioxide for use in enriching the carbon dioxide content of the atmosphere in the neighborhood of growing vegetable matter, and thereby to stimulate the growth thereof, which consists in forming readily ignitable carbonaceous matter, substantially free from substances which if vaporized or if converted into combustion products would prove injurious to the plants into a multiplicity of similar units of substantially the same content so that each, upon ignition-induced oxidation will give off substantially the same predetermined quantity of carbon dioxide gas, determining in multiples of the aforesaid units, computed as units of carbon dioxide gas supply, the amount of added carbon dioxide gas required in a given environment, and then slowly burning in said environment and ultimately to substantial completeness of predetermined carbon dioxide evolution, as many of the aforesaid units as will, according to the preregulated constitution of the units, supply the additional carbon dioxide gas indicated by the aforesaid determination as to the carbon dioxide gas requirements of the environment.

In testimony whereof I affix my signature.

ERICH REINAU.